June 16, 1959 G. RUMMERT 2,890,929
PROCESS FOR CARRYING OUT EXOTHERMIC CHEMICAL REACTIONS
Filed Dec. 23, 1955

INVENTOR
GUNTHER RUMMERT

BY Connolly & Hutz

ATTORNEYS

United States Patent Office 2,890,929
Patented June 16, 1959

2,890,929

PROCESS FOR CARRYING OUT EXOTHERMIC CHEMICAL REACTIONS

Günter Rummert, Burghausen (Salzach), Germany, assignor to Farbwerke Hoechst Aktiengesellschaft vormals Meister Lucius & Brüning, Frankfurt am Main, Germany, a corporation of Germany Application December 23, 1955, Serial No. 555,135

Claims priority, application Germany December 31, 1954

1 Claim. (Cl. 23—1)

The present invention relates to a new and useful process for carrying out exothermic chemical reactions. More particularly, the process of the present invention relates to exothermic chemical reactions between fluid reactants.

Numerous chemical reactions are known which are so highly exothermic that their initiation and control require a high degree of technical skill. As examples of such reactions there may be mentioned the reaction of hydrogen and chlorine to form hydrogen chloride, the reaction of oxygen and hydrogen to form water vapor and the chlorination of hydrocarbons to form various chlorides. In view of the nature of such reactions, the material of construction of the reaction vessels is of critical importance not only because of the heat generated during the reaction, but also, in many cases, because of the corrosive nature of one of the reactants or the reaction product.

One of the most common forms of apparatus for mixing the reactants and carrying out such reactions is a suitably formed feed pipe or burner nozzle which mixes and simultaneously injects the reactants into a chamber where the reaction occurs. This method has several basic disadvantages among which are poor recovery of the otherwise useful heat generated, the necessity of supplying the reactants at relatively high pressures which requires expensive compressors or blowers, and the need of auxiliary equipment to eliminate flash-back.

The aforesaid disadvantages and others associated with other forms of apparatus commonly used for carrying out exothermic reactions are overcome by the process of the present invention as will be clear from the following description taken in connection with the drawing wherein.

In accordance with the process of the present invention, an exothermic chemical reaction between fluid reactants is initiated and carried out by directing the flow of a stream of one of the reactants in a helicoidal path and interrupting and reversing this flow while simultaneously introducing another reactant in the direction of flow reversal and along an axis concentric with the axis of the helicoidal path to thereby intermix the reactants and propagate the reaction while withdrawing the products thereof along a path of extension of the path of the second reactant.

By means of the helicoidal path of one of the reactants and the simultaneous mixture and reaction of the one reactant and one or more other reactants within the confines of the helicoidal path, a number of advantages are obtained. Thus, if the reactant forming the stream moving in the helicoidal path is the least corrosive of the reactants, the construction material of the wall of the apparatus defining the external limits of the helicoidal path can often be an inexpensive metal such as sheet iron. This reactant also serves as an insulating medium to prevent extensive heating of the wall by the heat generated in the exothermic reaction. Furthermore, the insulating effect of the reactant stream moving in the helicoidal path allows the recovery of the heat generated, except for that lost to the wall by radiation, by a subsequent heat exchange recovery after withdrawal of the reaction products from the reaction vessel.

Figure 1:
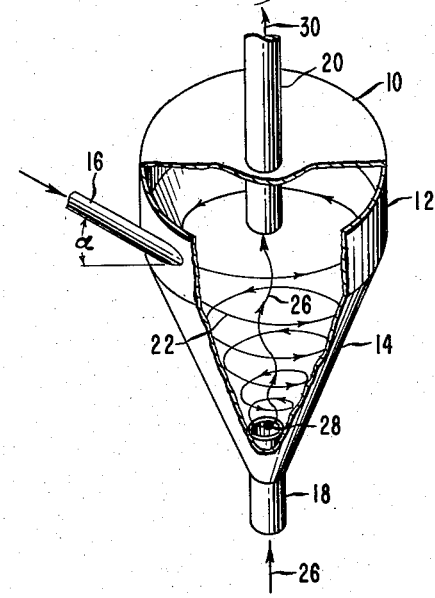
Figure 1 is a perspective view, partially broken away, of one form of apparatus useful in accordance with the process of the present invention.

With reference to Figure 1 of the drawing, the reaction vessel 10 is of circular cross-section throughout its length, the upper portion 12 being cylindrical and the lower portion 14 being conical in shape, and includes fluid stream reactant entrance conduits 16 and 18 and reaction product outlet 20. Entrance conduit 16 introduces one of the reactants, preferably the one having the least effect on the material of construction of reaction vessel 10 into reaction vessel 10 at a point adjacent one end thereof and in a direction, at the point of entry, substantially tangential to the cylindrical wall 12. Preferably, conduit 16 introduces the fluid stream at an acute angle $\alpha$ to a plane transverse to the axis of reaction vessel 10, the magnitude of the angle $\alpha$ depending upon the velocity of the stream flowing in conduit 16, the cross-sectional area of conduit 16, the cross-sectional area and length of reaction vessel 10 and other factors which will be apparent to those skilled in the art. A preferred value for the angle $\alpha$ insofar as most reactions are concerned is of the order of from 15° to 45°. As a result of the method of introducing the reactant stream into the reaction vessel 10 through conduit 16 and in view of the circular cross-section of reaction vessel 10, the fluid reactant stream defines a helicoidal path 22 moving in a direction toward the other end of reaction vessel 10 and following closely the wall of the reaction vessel 10.

Simultaneously, a second fluid stream is introduced by conduit 18 in an opposite direction and along a path 26 coincident with the axis of the reaction vessel 10 of central cross section. The direction of flow of the reactant stream of helicoidal path 22 is interrupted and reversed adjacent the point of introduction 28 of the other reactant stream with a resultant intermixing of the reactants and flow of the reactants upwardly along path 26 within the confines of the helicoidal path and concentric with the axis of reaction vessel 10. Upon admixture, the exothermic reaction is effected, with or without external aid, and the resultant products are withdrawn as a stream at the other end of the reaction vessel 10 along a path of extension 30 of the path of introduction 26 of the reactant entering through conduit 18.

Figure 2:
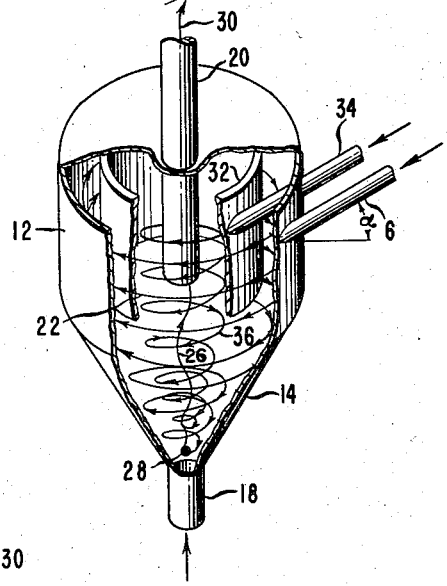
Figure 2 is a view similar to Figure 1 of a further form of apparatus useful in accordance with the process of the present invention.

Figure 2 of the drawing illustrates a modified form of the apparatus of Figure 1, like numerals designating identical portions thereof. In addition, Figure 2 includes cylindrical wall 32 concentric with the axis of the reaction vessel and a third conduit 34 for introducing another or third reactant stream. Conduit 34 enters the confines of cylindrical wall 32 in the same manner and at a similar angle $\alpha$, if desired, as conduit 16 enters the wall 12. As a result of the arrangement of Figure 2, the third reactant stream entering through conduit 34 forms another helicoidal path 36 moving in a direction toward the other end of the reaction vessel 10 but lying within the confines of the helicoidal path 22 formed by the stream entering through conduit 16. The second reaction component entering through conduit 18 and the mixture thereof with the other reactants and the resultant products flow in a direction opposite to that of the two described helicoidal paths of the first and third reactants and within the confines of the helicoidal path 36 of the third reactant and along the axis of the reaction vessel of Figure 2.

Figure 3:
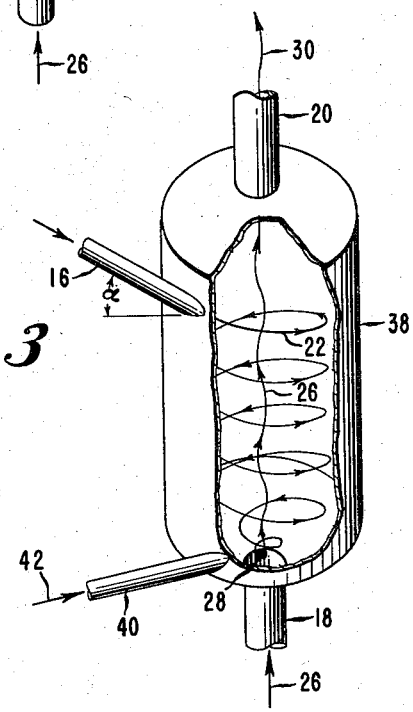
Figure 3 is a view similar to Figure 1 of still another form of apparatus useful in accordance with the process of the present invention.

Figure 3 of the drawing illustrates a modified form of the apparatus of Fig. 1, like numerals designating identical portions thereof. It will be noted, however, that the reaction vessel designated by numeral 38 is of substantially cylindrical form throughout its length. In addition, a third reactant is introduced adjacent the lower end of the reaction vessel 38 through conduit 40. The path 42 of the third reactant is directed toward point 28 in order to bring the three reactant components together simultaneously and admix the same. As a result, the exothermic reaction occurs with or without external aid, and the reaction products thereof move along path 26 to be withdrawn as path 30 through conduit 20.

As will be apparent from the above description of various examples of apparatus suitable for the process of the present invention, it is essential that one of the reactants be introduced as a stream into a confined zone of circular cross section at a point preferably adjacent one end thereof and in a direction to progressively define a helicoidal path of the stream moving in a direction toward the other end of the zone and that this path of flow be interrupted and reversed by the introduction of another reactant at the other end of the zone in an opposite direction so as to obtain admixture of the reactants and reaction within the helicoidal path. The reactant introduced in the form of a helicoidal path is preferably the one having the least effect on the construction of the wall of the reaction zone.

It will be apparent to those skilled in the art that although the reaction vessels of Figs. 1-3 are vertically arranged, they may be arranged horizontally or at an angle to the vertical. It will further be apparent that in the event the nature of the reaction is such that a catalyst is required, provision for its presence in the reaction zone may be accomplished by suspending the catalyst adjacent the point of admixture and reaction of the reactants by the use of a netting or other suitable catalyst support. In addition to the above, in the event that the exothermically-produced heat causes a temperature above the optimum temperature for the progress of the reaction, this can be controlled by dilution of one or more of the reactants with a reaction inert fluid or by supplying one of the reactants, preferably the one moving in the helicoidal path adjacent the inner wall of the reaction vessel, in a molar excess of that theoretically required for the reaction.

The foregoing description of the present invention and the examples presented hereinafter are for the purpose of illustration only and are not limiting to the scope of the invention which is set forth in the claims.

Example 1

In a reaction vessel similar to that depicted in Fig. 1 of the drawing, a stream of hydrogen is introduced through conduit 16 and a stream of chlorine is introduced through conduit 18. Ultra-violet light for the purpose of effecting reaction between hydrogen and chlorine is radiated through a quartz window (not shown in the drawing) in a direction along path 26 and just above point 28.

In view of the corrosive nature of the chlorine and that of the resulting hydrogen chloride, entrance conduit 18 and exhaust conduit 20 must be constructed of a material not subject to attack by these agents. Electric-furnace-produced graphite is a particularly suitable material of construction for these conduits. In view of the non-corrosive nature of hydrogen and the fact that the helicoidal path of hydrogen maintains the walls 12 and 14 cool, walls 12 and 14 of reaction vessel 10 and conduit 16 may be of sheet metal such as iron.

The reaction takes place immediately under the effect of the ultra-violet light and the hydrogen chloride withdrawn through conduit 20 may be heat exchanged against a suitable medium to recover its heat content.

Example 2

Into a reaction vessel similar to that of Fig. 3 of the drawing, a stream of water vapor is introduced via conduit 16, a stream of hydrogen is introduced via conduit 18 and a stream of oxygen is introduced via conduit 40. The resulting mixture at point 28 is ignited to produce steam which is withdrawn via conduit 20. By regulating the amount of low pressure water vapor introduced via conduit 16, the temperature of the steam withdrawn via conduit 20 can be regulated as desired. Instead of introducing oxygen through conduit 18 or hydrogen through conduit 40, one of these reactants may be admixed with the desired quantity of low pressure water vapor and the resulting mixture introduced via conduit 16.

In view of the blanketing effect of the low-pressure water vapor in its helicoidal path adjacent the inner wall of the reaction vessel, the heat content of the steam emerging via conduit 20 approximates from 90% to 95% of theory.

I claim:

A process for effecting admixture of fluid substances which are to react exothermically with one another which comprises the steps of introducing one of the reactants as a stream into a confined zone of circular cross-section at a point adjacent one end thereof and in a direction to define progressively a helicoidal path of said stream moving in a direction toward the other end of the zone, introducing a second reactant as a stream into a confined zone of circular cross-section concentric with the confined zone into which the one reactant is introduced and of smaller diameter, the direction of introduction of said helicoidal path into said second zone of circular cross-section progressively defining a helicoidal path of said stream moving in the same direction as said one reactant and within the confines thereof, introducing a third reactant as a stream at the other end of the zone in an opposite direction and along a path coincident with the axis of said zone of circular cross-section, the direction of flow of the first stream being interrupted and reversed adjacent the point of introduction of the third reactant stream with an intermixing of the reactants, effecting the exothermic chemical reaction between the reactants of the merging streams, and withdrawing resultant products as a stream adjacent the one end of the zone and along a path coincident with the path of introduction of the second stream.

References Cited in the file of this patent

UNITED STATES PATENTS

| | | |
|---|---|---|
| 366,118 | Lambotte | July 5, 1887 |
| 669,750 | Jones | Mar. 12, 1901 |
| 729,008 | Sutton et al. | May 26, 1903 |
| 729,009 | Sutton et al. | May 26, 1903 |
| 1,213,887 | Krause | Jan. 30, 1917 |
| 2,441,613 | Balassa | May 18, 1948 |
| 2,656,254 | Heller | Oct. 20, 1953 |